No. 788,722.

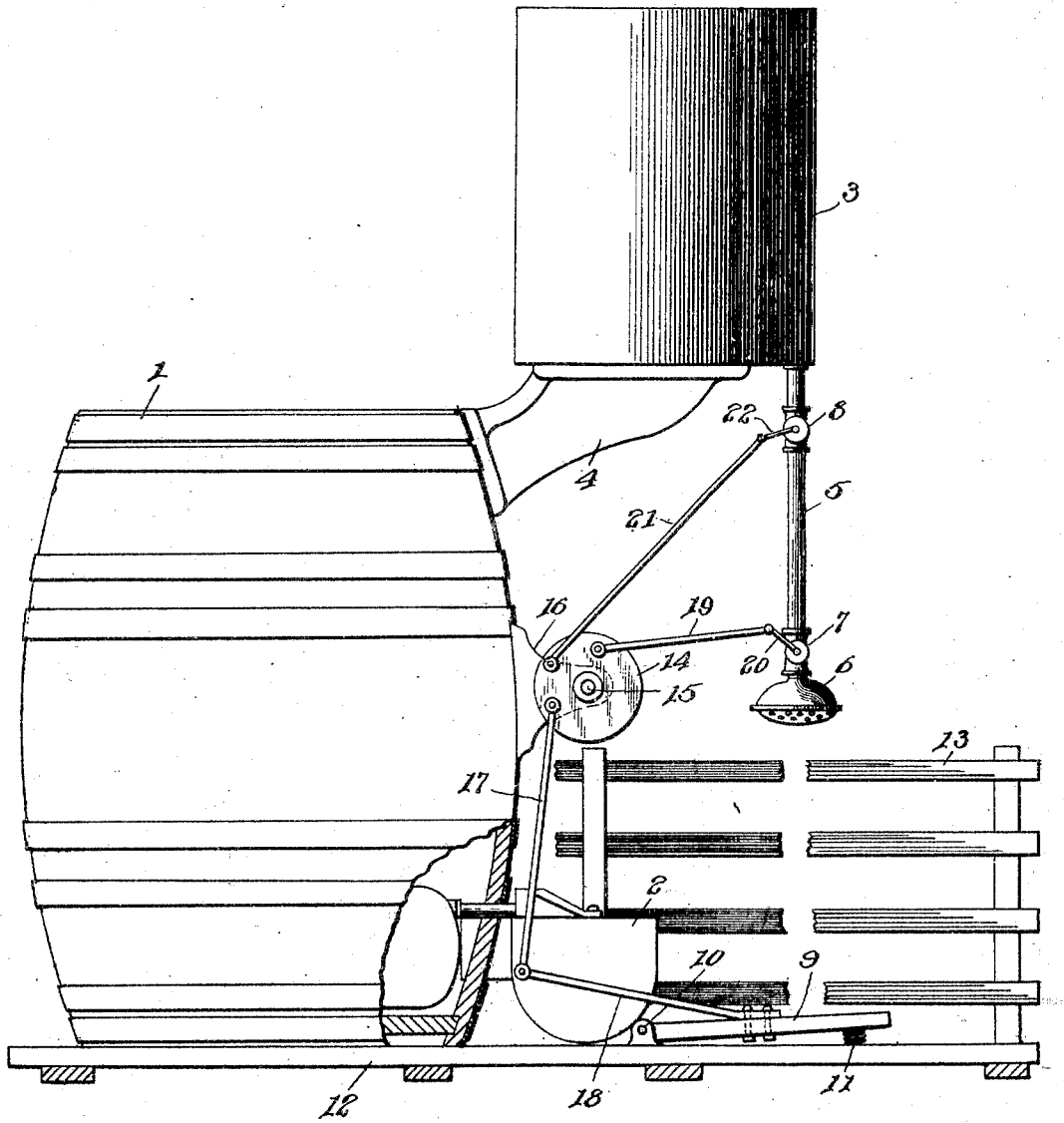

Patented May 2, 1905.

UNITED STATES PATENT OFFICE.

MOSES W. KOUNS, OF WASHINGTON COURT-HOUSE, OHIO.

STOCK-SPRAYER.

SPECIFICATION forming part of Letters Patent No. 788,722, dated May 2, 1905.

Application filed December 23, 1904. Serial No. 238,060.

*To all whom it may concern:*

Be it known that I, MOSES W. KOUNS, a citizen of the United States, residing at Washington Court-House, in the county of Fayette and State of Ohio, have invented certain new and useful Improvements in Stock-Sprayers, of which the following is a specification, reference being had therein to the accompanying drawing.

This invention relates to stock-sprayers, and has for its object to provide an automatic mechanism whereby a liquid, such as a liquid insecticide or other medicated or antiseptic liquid, may be sprayed or sprinkled over stock—such as hogs, sheep, or the like—without requiring the services of an attendant during the spraying operation.

To these ends my invention consists in certain novel features, which I will now proceed to describe and will then particularly point out in the claims.

In the accompanying drawing I have shown in elevation an apparatus embodying my invention in one form.

In the said drawing I have shown my improved apparatus as used in connection with an automatic waterer, although it may be used in other connections.

In the particular construction illustrated, 1 indicates a barrel or reservoir, and 2 a watering-trough or drinking-cup which is automatically supplied with water from the barrel.

3 indicates an elevated reservoir or tank containing the liquid which is to be sprayed, and when it is used in connection with the watering apparatus it may be conveniently supported, by means of a bracket 4, from the barrel 1. A discharge-spout 5 is connected to the reservoir 3 and terminates at its discharge end in a sprinkler or spraying-head 6, which may have any approved form. In the pipe 5 there are located valves 7 and 8, controlling the flow of the liquid through said pipe, the portion of said pipe between said valves constituting a measuring-chamber by means of which the amount of liquid discharged at each operation of the apparatus may be regulated. Adjacent to the trough or cup 2 and under the spraying-head 6 there is located a yielding platform 9, adapted to yield under the weight of the animal when stepped upon. This platform is preferably hinged at one edge, as indicated at 10, and is returned to its normal position when relieved of weight by any suitable means, a spring 11 being preferred. I find it convenient and prefer to support the barrel, trough, and yielding platform or tread upon a suitable fixed platform or base 12. Fences 13 or other suitable means are employed to prevent access to the trough except over the tread 9. Said tread or yielding platform is connected with the valves 7 and 8 by a suitable mechanism such that when the platform is depressed the lower valve will be opened and the upper valve closed and when the platform resumes its normal position the lower valve will be closed and the upper valve opened. The mechanism which I prefer for this purpose is that shown, comprising a rocking member 14, mounted to oscillate on a suitable axis 15, supported on a bracket 16, which may be attached to the barrel 1 or some other suitable support. A link 17, pivoted to the rocking member 14 at its upper end, is pivoted at its lower end to an arm 18, rigidly connected to and moving with the platform or tread 9. A link 19, pivotally connected to the rocking member 14 at one end, is pivoted at its other end to a crank-arm 20 on the stem of the valve 7 or is otherwise so connected to said valve as to open and close the same. A link 21, pivoted at one end to the rocking member 14, is pivoted at its other end to a crank-arm 22 on the stem of the valve 8 or otherwise so connected to said valve as to operate the same. The construction and arrangement of the parts are preferably such that when the platform 9 is depressed the valve 8 closes before the valve 7 opens and when the platform is raised the valve 7 closes before the valve 8 opens.

From a consideration of the construction described it will be seen that when an animal approaches the drinking-trough, as they do at more or less frequent intervals, it will step upon and depress the platform 9, thereby closing the valve 8 and opening the valve 7. The platform is located below the sprinkler 6, and the quantity of the sprinkling liquid contained in the pipe 5 between the two valves thereof will be sprayed over the animal as it stands upon the platform. When the predetermined quantity of the liquid has been thus sprayed out, no more will be discharged, since the valve 8 is closed and wasting of the liquid is thus prevented. When the animal leaves the platform, the spring 11 or other means employed for that end returns the platform to its normal position and through the intermediate mechanism closes the valve 7 and opens the valve 8, permitting another charge of the liquid to descend into the pipe 5, whereupon the apparatus is ready to spray the next visitor. The operation of the apparatus is automatic, the only attention required being the replenishing of the reservoir 8.

Although I prefer to employ the spraying apparatus in connection with a watering-trough, it may be used in connection with any device which will attract the animals—as, for instance, a feed-trough or the like—or the apparatus may be set up in any place, such as a gate or runway, where the animals are compelled or induced to pass in such a way as to operate the yielding platform.

Various modifications in the details of construction may be made without departing from the principle of my invention, and I therefore do not wish to be understood as limiting myself to the precise construction hereinbefore described, and shown in the accompanying drawing.

Having thus fully described my invention, what I claim as new, and desire to secure by Letters Patent, is—

1. A stock-sprayer comprising a yielding platform, an elevated reservoir, a spraying-head located above the platform, a conduit connecting said head and reservoir, two valves located at separated points in said conduit, and mechanism connecting the platform and said valves, whereby the valve nearest the reservoir is closed and the other valve opened when the platform is depressed, and the valve nearest the spraying-head is closed and the other valve opened when the platform rises, substantially as described.

2. A stock-sprayer comprising a spring-supported yielding platform, an elevated reservoir, a spraying-head located above the platform, a conduit connecting said head and reservoir, two valves located at separated points in said conduit, a rocking member, and links operatively connecting the platform and valves with said rocking member, substantially as described.

3. An apparatus of the character described comprising a barrel and a drinking-trough supplied therefrom, a yielding platform located adjacent and in the path of access to said trough, an elevated reservoir supported from the barrel, a spraying-head located above the platform, a conduit connecting said head and reservoir, valves located at separated points in said conduit, a rocking member mounted on the barrel, and links operatively connecting the valves and platform with said rocking member, substantially as described.

In testimony whereof I affix my signature in presence of two witnesses.

MOSES W. KOUNS.

Witnesses:
F. W. SCHAEFER,
HARRIET HAMMAKER.